US011505205B2

(12) United States Patent
Homma

(10) Patent No.: US 11,505,205 B2
(45) Date of Patent: Nov. 22, 2022

(54) VEHICLE SEAT CONTROL APPARATUS

(71) Applicant: SUBARU CORPORATION, Tokyo (JP)

(72) Inventor: Takuya Homma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/383,497

(22) Filed: Jul. 23, 2021

(65) Prior Publication Data

US 2022/0032944 A1 Feb. 3, 2022

(30) Foreign Application Priority Data

Jul. 30, 2020 (JP) ............................ JP2020-129720

(51) Int. Cl.

| | |
|---|---|
| ***B60W 50/14*** | (2020.01) |
| ***B60N 2/02*** | (2006.01) |
| ***B60W 40/08*** | (2012.01) |
| ***B60W 60/00*** | (2020.01) |

(52) U.S. Cl.

CPC ........... *B60W 50/14* (2013.01); *B60N 2/0252* (2013.01); *B60W 40/08* (2013.01); *B60W 60/0053* (2020.02); *B60N 2002/0268* (2013.01); *B60W 2040/0818* (2013.01); *B60W 2540/223* (2020.02); *B60W 2540/229* (2020.02)

(58) Field of Classification Search

CPC .. B60W 50/14; B60W 40/08; B60W 60/0053; B60W 2040/0818; B60W 2540/223; B60W 2540/229; B60W 2050/146; B60W 2540/221; B60N 2/0252; B60N 2002/0268; B60N 2/0232; B60N 2/0276; B60N 2/06; B60N 2/16; B60N 2/22; B60N 2/838; B60N 2/002

See application file for complete search history.

(56) References Cited

U.S. PATENT DOCUMENTS

| | | | | |
|---|---|---|---|---|
| 2017/0144568 | A1 | 5/2017 | Torii et al. | |
| 2019/0241099 | A1* | 8/2019 | Sugiyama | B60N 2/64 |
| 2020/0086764 | A1* | 3/2020 | Mimura | B60W 30/18 |

(Continued)

FOREIGN PATENT DOCUMENTS

| | | |
|---|---|---|
| JP | 2008-170404 A | 7/2008 |
| JP | 2017-094899 A | 8/2017 |

*Primary Examiner* — Daryl C Pope

(74) *Attorney, Agent, or Firm* — Troutman Pepper Hamilton Sanders LLP

(57) ABSTRACT

A vehicle seat control apparatus is equipped in a vehicle capable of travelling by automated driving and is configured to set a position and attitude of a seat of the vehicle to a driving position in low automated driving and to set the position and attitude of the seat to a relaxing position in high automated driving. The vehicle seat control apparatus includes an alertness detecting device configured to detect an alertness level of a driver seated on the seat, a computation control device configured to drive the seat driving device to perform an alerting operation if the alertness level is lower than a predetermined level when driving of the vehicle transitions from the high automated driving to the low automated driving, and a seat driving device configured to displace the seat at a higher speed than at a transition from the driving position to the relaxing position.

8 Claims, 7 Drawing Sheets

(56) References Cited

U.S. PATENT DOCUMENTS

| | | | | |
|---|---|---|---|---|
| 2020/0391617 | A1* | 12/2020 | Lee | B60N 2/0284 |
| 2021/0188049 | A1* | 6/2021 | Etienne | B60H 1/00742 |
| 2021/0188324 | A1* | 6/2021 | Kim | B60W 60/0059 |

* cited by examiner

VEHICLE SEAT CONTROL APPARATUS

CROSS-REFERENCE TO RELATED APPLICATIONS

The present application claims priority from Japanese Patent Application No. 2020-129720 filed on Jul. 30, 2020, the entire contents of which are hereby incorporated by reference.

BACKGROUND

The disclosure relates to a vehicle seat control apparatus and particularly relates to a vehicle seat control apparatus that alerts a driver at a transition from high automated driving to low automated driving.

Japanese Unexamined Patent Application Publication (JP-A) No. 2008-170404 discloses an automated driving support apparatus capable of performing automated driving which does not depend on an operation performed by a driver and in which a vehicle-control electronic control unit (ECU) controls all of an accelerator operation, a brake operation, and a steering wheel operation, which are operations related to vehicle behaviors. The automated driving support apparatus disclosed in JP-A No. 2008-170404 drives and controls an engine device, a brake device, an electric power steering device, and so forth, thereby performing automated driving until a stop timing on a guiding route.

Furthermore, a technique of bringing a seat into a relaxing mode during automated driving has been developed for the purpose of, for example, reducing fatigue of a driver in the above-described automated driving. In one example, when a vehicle enters an automated driving state, a seat is moved backward and a seatback is tilted backward. This makes it possible to move the driver away from a steering wheel and reduce fatigue of the driver without hindering steering and so forth in automated driving.

Furthermore, a technique of coping with a decrease in alertness level of a driver during automated driving has been developed (for example, JP-A No. 2017-094899). In the technique described in JP-A No. 2017-094899, an armrest controller repeats an up-and-down motion of a supporter of an armrest when a driver alertness determiner determines that the alertness level of the driver is in a decreased state. This makes it possible to increase the alertness level of the driver when the alertness level of the driver is in a decreased state.

SUMMARY

An aspect of the disclosure provides a vehicle seat control apparatus that is equipped in a vehicle capable of travelling by automated driving in accordance with a relative level of driving automation and that is configured to set a position and attitude of a seat of the vehicle to a driving position in low automated driving that is low in the level and to set the position and attitude of the seat to a relaxing position in high automated driving that is high in the level. The vehicle seat control apparatus includes an alertness detecting device, a computation control device, and a seat driving device. The alertness detecting device is configured to detect an alertness level of a driver to be seated on the seat. The computation control device is configured to drive the seat driving device to perform an alerting operation in a case where the alertness level of the driver detected by the alertness detecting device is lower than a predetermined level when driving of the vehicle transitions from the high automated driving to the low automated driving. The seat driving device is configured to, in response to an instruction from the computation control device in the alerting operation, displace the seat at a higher speed than at a transition from the driving position to the relaxing position.

An aspect of the disclosure provides a vehicle seat control apparatus that is equipped in a vehicle capable of travelling by automated driving in accordance with a relative level of driving automation and that is configured to set a position and attitude of a seat of the vehicle to a driving position in low automated driving that is low in the level and to set the position and attitude of the seat to a relaxing position in high automated driving that is high in the level. The vehicle seat control apparatus includes an alertness detector, circuitry, and a seat driver. The alertness detector includes a sensor and is configured to detect an alertness level of a driver to be seated on the seat. The circuitry is configured to drive the seat driver to perform an alerting operation in a case where the alertness level of the driver detected by the alertness detector is lower than a predetermined level when driving of the vehicle transitions from the high automated driving to the low automated driving. The seat driver is configured to, in response to an instruction from the circuitry in the alerting operation, displace the seat at a higher speed than at a transition from the driving position to the relaxing position.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIGS. 2A and 2B are diagrams each illustrating the vehicle equipped with the vehicle seat control apparatus according to the embodiment of the disclosure, in which FIG. 2A is a side view illustrating a driving position and FIG. 2B is a side view illustrating a relaxing position;

DETAILED DESCRIPTION

Figure 1:
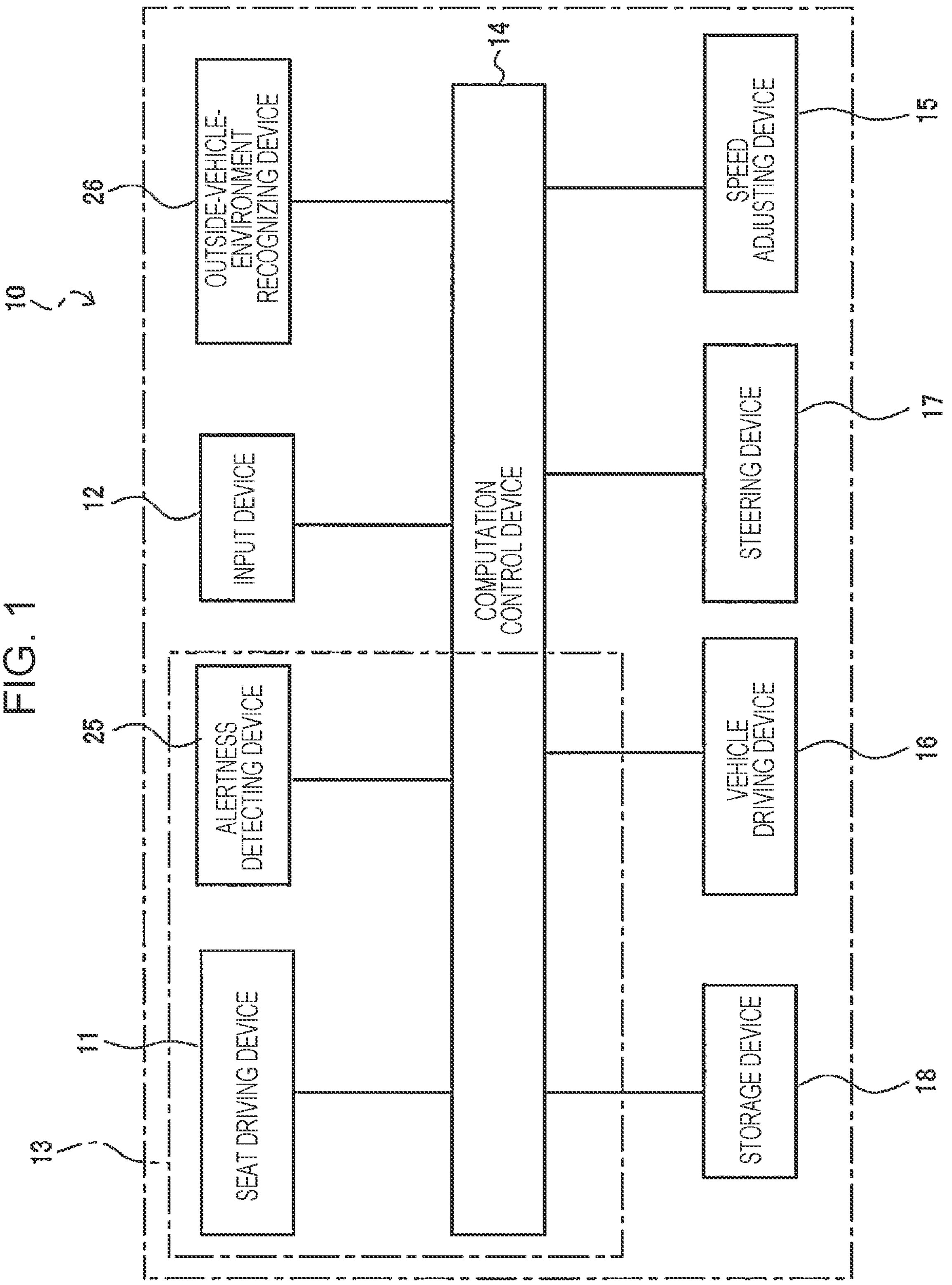
FIG. 1 is a block diagram illustrating a coupling configuration of a vehicle equipped with a vehicle seat control apparatus according to an embodiment of the disclosure.

The technique described in JP-A No. 2017-094899 is susceptible to improvement from the viewpoint of securing the alertness level of the driver. In one example, the technique described in JP-A No. 2017-094899 has an issue that, although an up-and-down motion of the supporter of the armrest is repeated when the alertness level of the driver is insufficient, the up-and-down motion does not necessarily make the driver sufficiently alert. Furthermore, if too much time is taken to alert the driver, the driver may lack alertness when restarting manual driving.

It is desirable to provide a vehicle seat control apparatus capable of effectively alerting a driver at a transition from high automated driving to low automated driving.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the present embodiment, a vehicle 10 is capable of travelling at various levels of driving automation.

The levels of driving automation are defined by SAE International J3016, and JASO TP 18004 which is a reference translation into Japanese. According to the definition, the levels of driving automation include Level 0 to Level 5 as described below.

Level 0 is referred to as “no driving automation” or “manual driving” in which, for example, the driver performs all dynamic driving tasks. Level 1 is referred to as “driver assistance” in which, for example, the system performs a sub-task of vehicle movement control in either of a forward-backward direction and a right-left direction in a limited region. Level 2 is referred to as “partial driving automation” in which, for example, the system performs a sub-task of vehicle movement control in both of a forward-backward direction and a right-left direction in a limited region. Level 3 is referred to as “conditional driving automation” in which, for example, the system performs all dynamic driving tasks in a limited region and the driver is expected to appropriately respond to an intervention request or the like from the system when the operation is difficult to be continued. Level 4 is referred to as “high driving automation” in which, for example, the system performs, in a limited region, all dynamic driving tasks and responding to a situation in which the operation is difficult to be continued. Level 5 is referred to as “full driving automation” in which, for example, the system performs all dynamic driving tasks and responding to a situation in which the operation is difficult to be continued.

High automated driving and low automated driving according to the present embodiment have relative levels of driving automation. In other words, the high automated driving is higher in the level of automated driving than the low automated driving. For example, when the high automated driving corresponds to Level 5, the low automated driving corresponds to any one of Level 4 to Level 0. Here, for example, driving at Level 5 is also referred to as full-automated driving, driving at Level 4 to Level 1 is also referred to as semi-automated driving, and driving at Level 0 is also referred to as manual driving.

FIG. 1 is a block diagram illustrating an overview of the vehicle 10 including a seat control apparatus 13 (vehicle seat control apparatus) according to an embodiment of the disclosure. The seat control apparatus 13 includes an alertness detecting device 25, a computation control device 14, and a seat driving device 11, is mounted in the vehicle 10, and serves as a part of a control mechanism that controls the vehicle 10. The seat control apparatus 13 sets the position and attitude of a seat 20 to a driving position in low automated driving, which is manual driving, for example, and sets the position and attitude of the seat 20 to a relaxing position in high automated driving, which is full-automated driving, for example. Furthermore, the seat control apparatus 13 performs an alerting operation of alerting a driver 24 on the basis of the alertness level of the driver 24 in high automated driving, as described below.

The devices equipped in the vehicle 10 for implementing automated driving will be described. In one example, the vehicle 10 includes the computation control device 14, the seat driving device 11, the alertness detecting device 25, an input device 12, an outside-vehicle-environment recognizing device 26, a storage device 18, a vehicle driving device 16, a steering device 17, and a speed adjusting device 15.

The computation control device 14 is a controller of the vehicle 10 and is, for example, an electronic control unit (ECU) or the like including a computation device or the like that performs various computation operations and the like. The computation control device 14 controls the vehicle driving device 16, the steering device 17, and the speed adjusting device 15 on the basis of input information or the like received from the input device 12 and the outside-vehicle-environment recognizing device 26, thereby performing automated driving of the vehicle 10. Furthermore, as described below, the computation control device 14 drives the seat driving device 11 on the basis of information about the positions and attitudes of the seat 20 stored in the storage device 18, thereby setting the seat 20 to the driving position in low automated driving and setting the seat 20 to the relaxing position in high automated driving.

Furthermore, the computation control device 14 performs switching between normal low automated driving in which the driver 24 performs driving operations and high automated driving in which the computation control device 14 automatically performs driving, in response to an instruction or the like from the input device 12. In addition, the computation control device 14 drives the seat driving device 11 to perform an alerting operation in a case where the alertness level of the driver 24 detected by the alertness detecting device 25 is lower than a certain level when driving of the vehicle 10 transitions from high automated driving to low automated driving.

The seat driving device 11 is a seat driver including a motor or the like and equipped at or near the seat 20 on which the driver 24 is seated. In an alerting operation, the seat driving device 11 displaces the seat 20 downward or upward at a higher speed than at a transition from the driving position to the relaxing position, in response to an instruction from the computation control device 14.

The alertness detecting device 25 detects the alertness level of the driver 24 seated on the seat 20. The alertness detecting device 25 is, for example, an image sensor that captures an image of the driver 24, a sensor that senses vital data, such as a heart rate, a blood pressure, or a body temperature, of the driver 24, or the like.

The input device 12 includes a switch, such as a press button, and a touch screen or the like that can be operated by a passenger who is the driver 24. The driver 24 operates the input device 12, thereby being capable of setting high automated driving or providing an instruction to start or end high automated driving.

The outside-vehicle-environment recognizing device 26 is a device for recognizing an environment outside the vehicle 10 and includes, for example, a stereo camera, a radar device, and the like.

The vehicle driving device 16 includes an engine, a motor, and the like serving as a power source for causing the vehicle 10 to travel.

The steering device 17 includes a steering wheel or the like for steering the vehicle 10.

The storage device 18 includes a random access memory (RAM) and a read only memory (ROM), and serves as storage for storing information indicating the positions and attitudes of the seat 20 (seat information) in high automated driving and low automated driving. A position and attitude of the seat 20 includes, for example, a position in a forward-backward direction of the seat 20, an angle of a seatback 22, a position in an upward-downward direction and an inclination angle of a seat cushion 21, and a position in the upward-downward direction and an angle of a headrest 23. In the present embodiment, the vehicle 10 may have a so-called seat memory mechanism that automatically adjusts the position and attitude of the seat 20 to a position and attitude suitable for the driver 24 on the basis of the seat information stored in the storage device 18 in response to seating of the driver 24 on the seat 20 and a predetermined input operation performed by the driver 24. Furthermore, the storage device 18 stores a program for executing an operation of the seat control apparatus 13 for alerting the driver 24, which will be described below.

The speed adjusting device 15 is a speed adjuster that accelerates, decelerates, and stops the vehicle 10. The speed adjusting device 15 operates in response to, for example, depressing of a brake pedal or an accelerator pedal by the driver 24 or a signal from the computation control device 14.

The vehicle 10 may include a notification device, such as a multifunction display or a speaker, which is not illustrated.

The computation control device 14 of the vehicle 10 performs high automated driving and low automated driving in the following manner, for example.

In high automated driving (for example, full-automated driving), the computation control device 14 performs various computation operations on the basis of information received from the outside-vehicle-environment recognizing device 26 and so forth, and constantly monitors a current travelling state, an outside environment, and so forth. The computation control device 14 controls the speed adjusting device 15, the vehicle driving device 16, the steering device 17, and so forth, and performs appropriate automated driving in accordance with a current situation. In this way, the computation control device 14 has an automated driving function and is capable of automatically performing driving operations of the vehicle 10.

The computation control device 14 changes the driving of the vehicle 10 from high automated driving to low automated driving on the basis of input information received from the input device 12 or the outside-vehicle-environment recognizing device 26. At this time, the driver 24 is lying on the seat 20 that is in the relaxing position, and the seat 20 transitions from the relaxing position to the driving position. In the present embodiment, the seat 20 is partially displaced at a transition from high automated driving to low automated driving to effectively alert the driver 24, as described below.

Figure 2A:
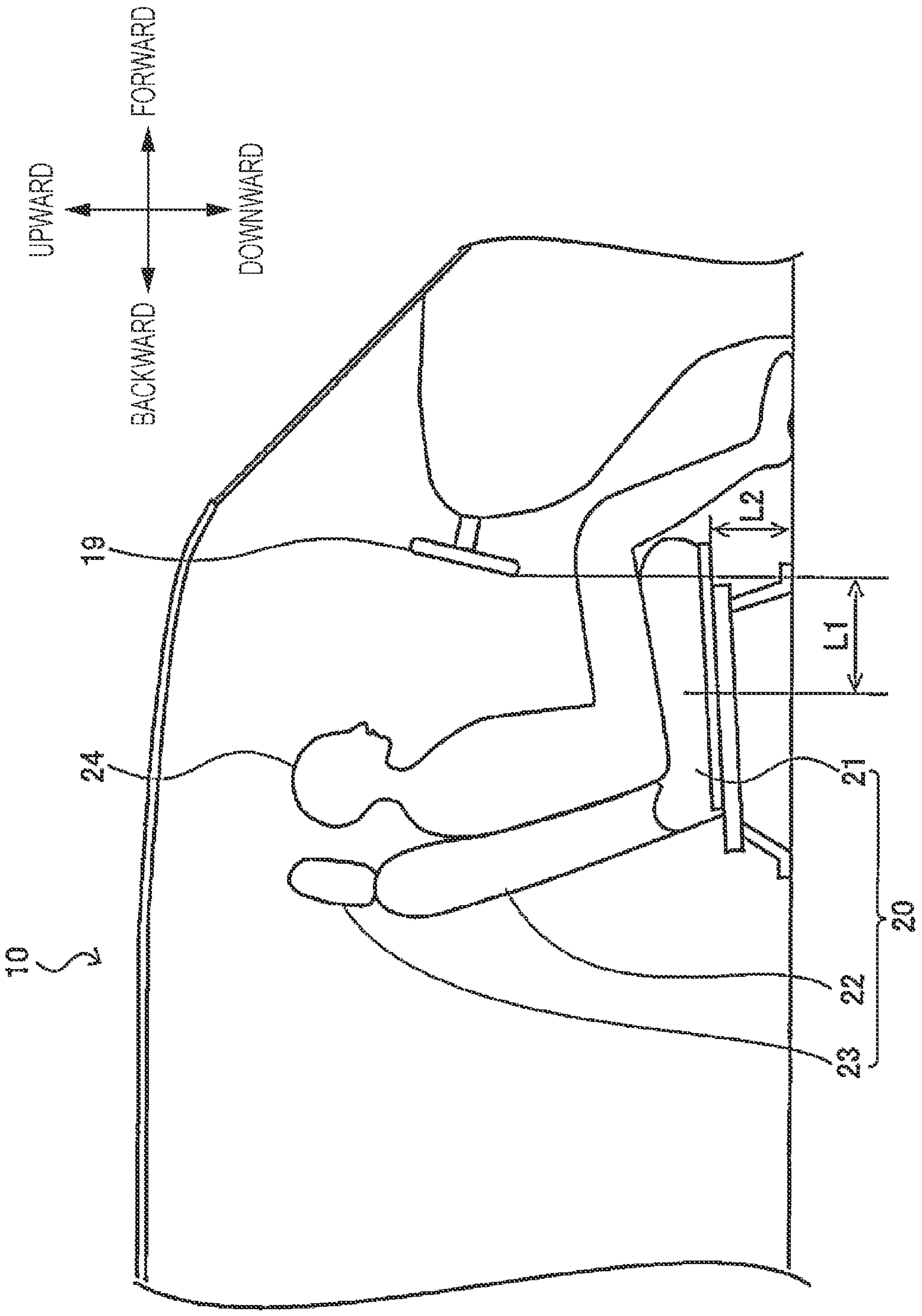
Figure 2B:
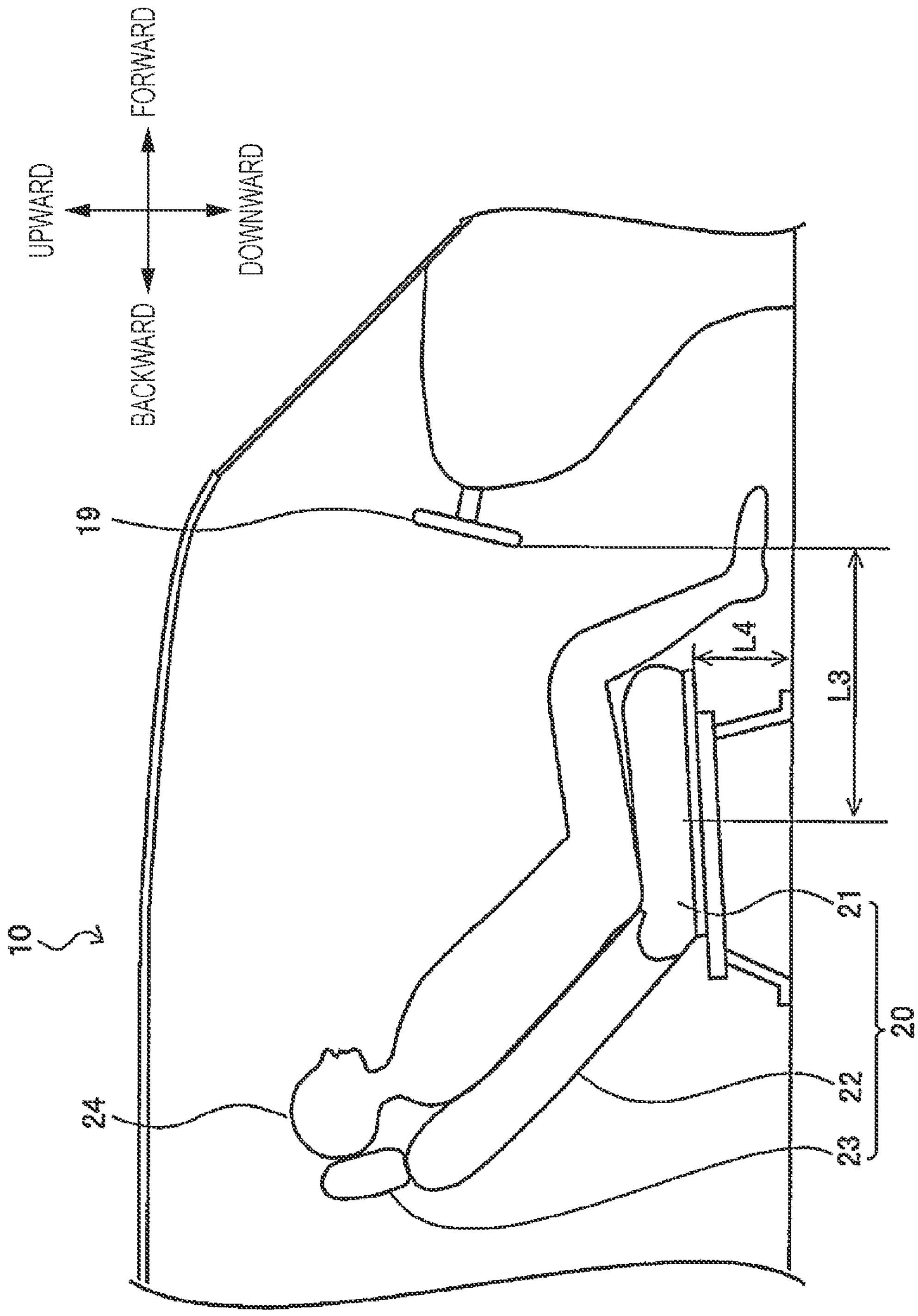

The positions and attitudes of the seat 20 according to the present embodiment will be described with reference to FIGS. 2A and 2B. FIG. 2A is a side view illustrating the position and attitude of the seat 20 in the driving position. FIG. 2B is a side view illustrating the position and attitude of the seat 20 in the relaxing position.

Here, the driving position is a seat attitude of supporting a driving attitude mainly for collecting information on ahead of the vehicle 10 or outside the vehicle 10 that is used to drive the vehicle. The relaxing position is a seat attitude for reducing physical and mental fatigue of the driver 24 by mainly displacing, by a certain amount, the upper body of the driver 24 downward (backward) from the driving position.

Referring to FIG. 2A, in low automated driving (for example, manual driving) in which the driver 24 drives the vehicle 10, the position and attitude of the seat 20 is set to the driving position suitable for manual driving. The driving position is a seat position and attitude set by the driver 24 so that the driver 24 can easily operate a steering wheel 19 and a brake pedal that is not illustrated during low automated driving. In one example, the driving position corresponds to a state in which the position in the forward-backward direction of the seat 20 (here, a distance L1 from the center of the seat cushion 21 to the steering wheel 19), the angle of the seatback 22, the height of the seat cushion (here, a distance L2 from the lower edge of the seat cushion 21 to a vehicle floor), and the position in the upward-downward direction and the angle of the headrest 23 are suitable for manual driving.

Referring to FIG. 2B, in high automated driving in which the computation control device 14 drives the vehicle 10, the position and attitude of the seat 20 is set to the relaxing position suitable for alleviating fatigue of the driver 24. The relaxing position is a seat position and attitude in which the seat 20 has been moved backward and the seatback 22 has been tilted backward so that the driver 24 can relax without automated driving being hindered.

In one example, as compared with the above-described driving position, the seat 20 is moved backward. That is, a distance L3 from the center of the seat cushion 21 to the steering wheel 19 is longer than the distance L1 illustrated in FIG. 2A. Accordingly, the driver 24 is moved backward and thus becomes able to stretch his/her legs forward and reduce fatigue caused by boarding on the vehicle 10. Furthermore, the driver 24 can be kept away from the steering wheel 19, the brake pedal that is not illustrated, and so forth, and a situation can be prevented in which the driver 24 unintentionally touches the steering wheel 19 or the like during high automated driving.

Furthermore, in the relaxing position, the seatback 22 is tilted backward as compared with the driving position. Thus, the driver 24 is able to lie down by reclining his/her upper body and reduce fatigue caused by boarding on the vehicle 10. Furthermore, in the relaxing position, the seat 20 may be moved upward. That is, a distance L4 between the seat cushion 21 and the vehicle floor in the relaxing position is longer than the distance L2 in the driving position. Accordingly, in high automated driving, the position of the head of the driver 24 is raised and a favorable field of view of the driver 24 can be secured.

At a transition from the driving position illustrated in FIG. 2A to the relaxing position illustrated in FIG. 2B, the seat driving device 11 (FIG. 1) moves the entire seat 20 backward and rotates the seatback 22 backward at a predetermined angular speed. At this time, the seat driving device 11 rotates the seatback 22 backward at such a low speed that the driver 24 does not feel uneasy or surprised.

At a transition from the relaxing position illustrated in FIG. 2B to the driving position illustrated in FIG. 2A, the seat driving device 11 (FIG. 1) moves the entire seat 20 forward and rotates the seatback 22 forward at a predetermined angular speed. At this time, the seat driving device 11 rotates the seatback 22 forward at such a low speed that the driver 24 does not feel uneasy or surprised as in the above-described case.

A method for controlling the seat 20 using the seat control apparatus 13 according to the present embodiment will be described with reference to FIGS. 3 to 6 and also to the figures described above. In brief, the control performed herein displaces a part of the seat 20 downward at a higher speed than at a transition from the driving position to the relaxing position in response to an instruction from the computation control device 14 in an alerting operation for alerting the driver 24. This method makes it possible to alert the driver 24 before a transition from high automated driving to low automated driving is completed.

Figure 3:
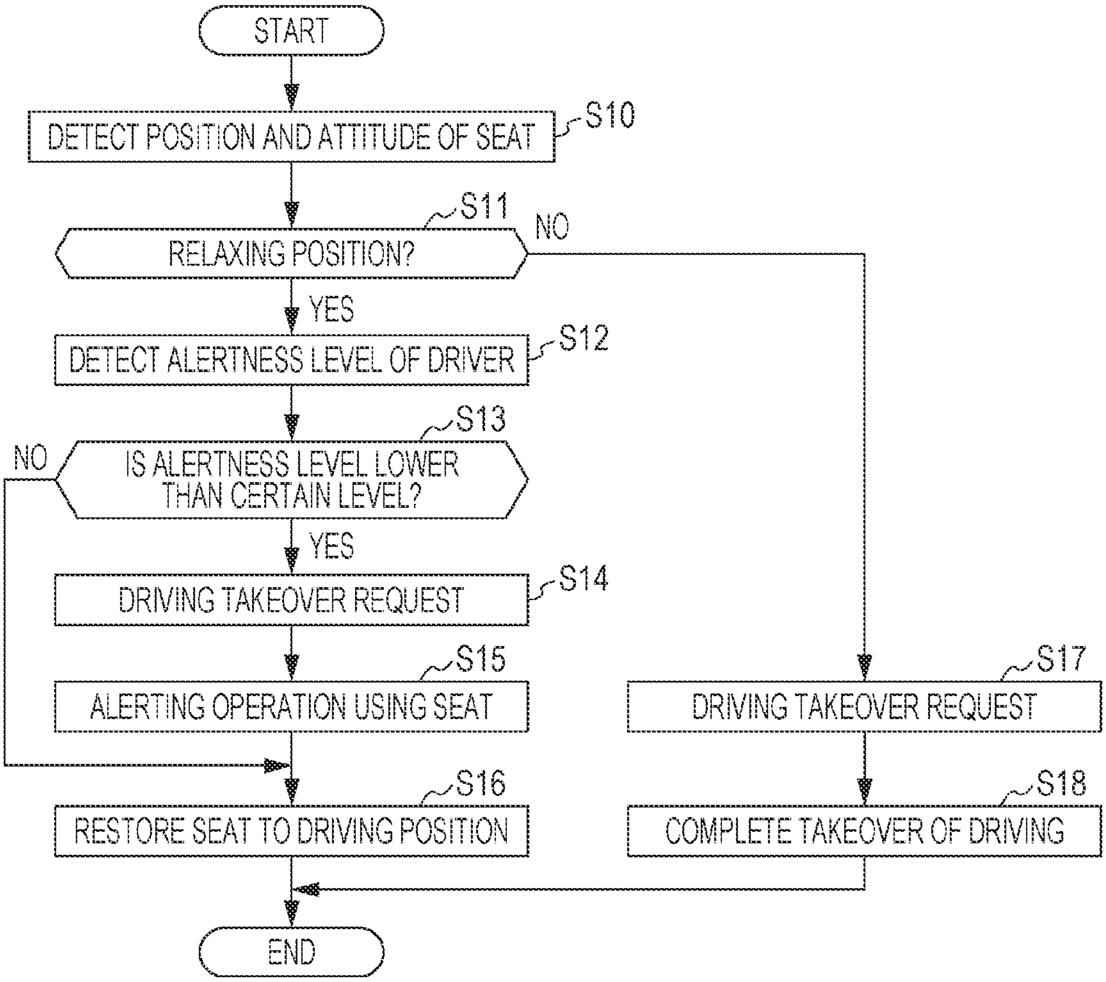
FIG. 3 is a flowchart illustrating control performed at a transition from high automated driving to low automated driving in the vehicle seat control apparatus according to the embodiment of the disclosure.

FIG. 3 is a flowchart illustrating control performed by the seat control apparatus 13 at a transition from high automated driving to low automated driving. Here, a transition of vehicle driving is, for example, a transition from full-automated driving to semi-automated driving, a transition from full-automated driving to manual driving, or a transition from semi-automated driving to manual driving.

In step S10, the position and attitude of the seat 20 is detected. That is, the computation control device 14 detects the position in the forward-backward direction of the seat 20, the angle of the seatback 22, and so forth on the basis of a sensor disposed near the seat 20, an operation status of the seat driving device 11, or the like.

In step S11, the computation control device 14 detects whether the seat 20 is in the driving position or the relaxing position on the basis of the detection result obtained in step S10.

If the determination in step S11 is YES, that is, if the position and attitude of the seat 20 is the relaxing position, the computation control device 14 proceeds to step S12 to perform an alerting operation as appropriate.

If the determination in step S11 is NO, that is, if the position and attitude of the seat 20 is not the relaxing position, for example, if the position and attitude of the seat 20 is the driving position, an alerting operation is not to be performed and thus the process proceeds to step S17.

In step S12, the alertness level of the driver 24 is detected. For example, the alertness detecting device 25 detects the alertness level of the driver 24 by using a moving image or still image depicting the driver 24 in response to an instruction from the computation control device 14. In one example, the alertness detecting device 25 detects the alertness level of the driver 24 on the basis of the eye-opening ratio, the state of looking aside, and the posture of the driver 24, driving duration, the frequency at which an in-vehicle display is operated, the type of content displayed, upper-body behaviors, and so forth. For example, when the eye-opening ratio is small, when the degree of looking aside is high, when the posture is close to a reclining position, when the driving duration is long, when the frequency at which the in-vehicle display is operated is low, when the displayed content is content attracting attention, such as video, or when the number of upper-body behaviors is small, the alertness detecting device 25 detects that the alertness level of the driver 24 is low.

In step S13, the computation control device 14 determines whether the alertness level of the driver 24 is lower than a certain level. For example, the computation control device 14 determines whether the alertness level is lower than the certain level on the basis of the eye-opening ratio of the driver 24 detected by the alertness detecting device 25.

If the determination in step S13 is YES, for example, if the alertness detecting device 25 detects that the eye-opening ratio of the driver 24 is smaller than a certain ratio, the computation control device 14 determines that the alertness level of the driver 24 is lower than the certain level. Subsequently, the computation control device 14 proceeds to step S14 to perform an alerting operation.

If the determination in step S13 is NO, for example, if the alertness detecting device 25 detects that the eye-opening ratio of the driver 24 is greater than or equal to the certain ratio, the computation control device 14 determines that the alertness level of the driver 24 is higher than or equal to the certain level. Subsequently, the computation control device 14 proceeds to step S16 without performing an alerting operation.

In step S14, the computation control device 14 makes a driving takeover request. For example, the computation control device 14 displays a message or the like that prompts the driver 24 to take over driving on a display, or outputs a sound that prompts the driver 24 to take over driving from a speaker. Accordingly, the driver 24 is able to be aware that the vehicle 10 will shift to low automated driving and that the driver 24 is requested to intervene in driving.

In step S15, the computation control device 14 performs an alerting operation using the seat 20 to alert the driver 24 having a low alertness level. The details of step S15 will be described in detail below with reference to FIGS. 4, 5, and 6.

Figure 4:
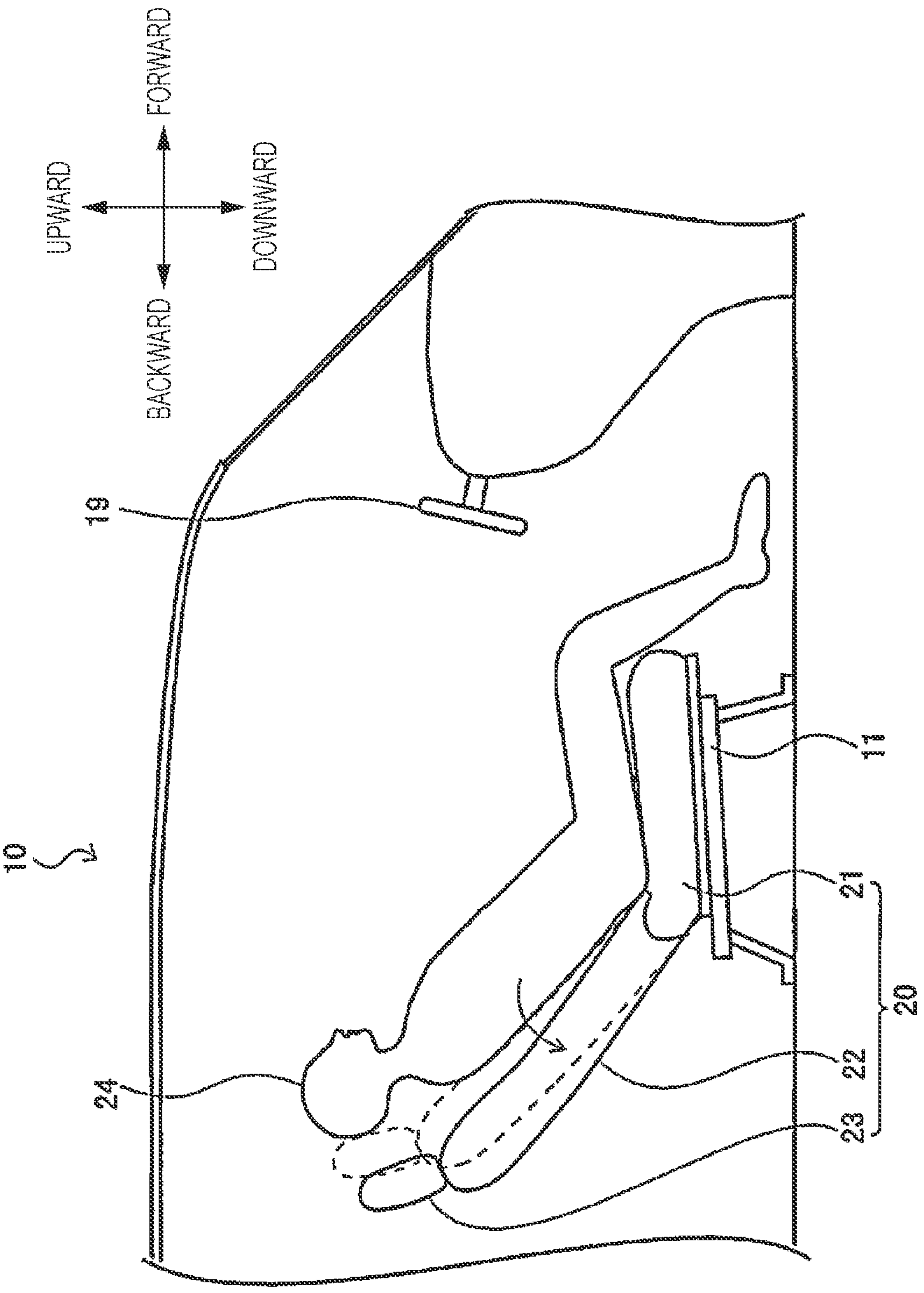
FIG. 4 is a side view illustrating a method for alerting a driver by tilting a seatback in the vehicle seat control apparatus according to the embodiment of the disclosure.

FIG. 4 is a side view illustrating a method for alerting the driver 24 by tilting the seatback 22 in the vehicle seat control apparatus 13. Here, the seatback 22 tilted in step S15 is depicted with a solid line, whereas the seatback 22 before being tilted is depicted with a broken line.

Referring to FIG. 4, in step S15, the seat driving device 11 tilts the seatback 22 backward with the lower end thereof being a rotation center, in response to an instruction from the computation control device 14. The rotation speed of the seatback 22 in step S15 is higher than the rotation speed at which the seatback 22 is tilted when the seat 20 transitions from the driving position to the relaxing position. At this time, the seatback 22 and the headrest 23 may be tilted backward while being in close contact with the upper limbs of the driver 24. Furthermore, the seatback 22 and the headrest 23 may instantaneously be apart from the upper limbs of the driver 24.

In this way, the driver 24 has a feeling that his/her upper limbs fall, and thus the driver 24 is instantaneously and intensely alerted. Furthermore, the driver 24 is prompted to raise his/her upper body, and the driver 24 is able to quickly shift to a manual driving operation. The rotation angle of the seatback 22 in step S15 is smaller than when the seat 20 transitions from the driving position to the relaxing position. This makes it possible to appropriately shorten the length over which the upper limbs of the driver 24 fall, appropriately adjust a stimulus given to the driver 24, and prevent the driver 24 from being injured.

Figure 5:
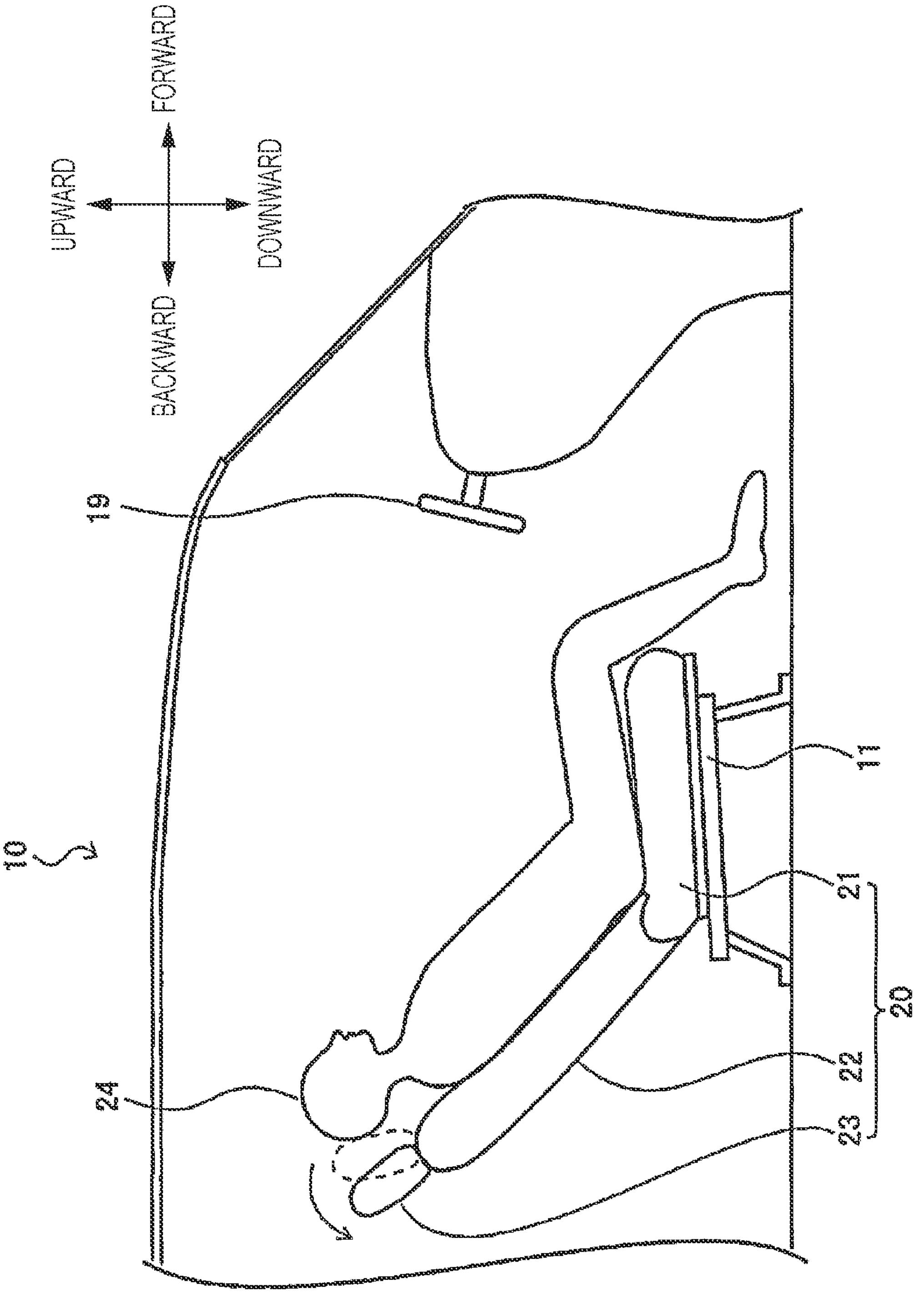
FIG. 5 is a side view illustrating a method for alerting a driver by tilting a headrest in the vehicle seat control apparatus according to the embodiment of the disclosure.

Another example of step S15 will be described with reference to FIG. 5. FIG. 5 is a side view illustrating a method for alerting the driver 24 by tilting the headrest 23. In FIG. 5, the headrest 23 tilted in step S15 is depicted with a solid line, whereas the headrest 23 before being tilted is depicted with a broken line.

Here, the seat driving device 11 tilts the headrest 23 backward with the lower end thereof being a rotation center, in response to an instruction from the computation control device 14. The rotation speed of the headrest 23 in step S15 is higher than the rotation speed at which the seatback 22 is tilted when the seat 20 transitions from the driving position to the relaxing position. At this time, the headrest 23 may be tilted backward while being in close contact with the head of the driver 24. Furthermore, the headrest 23 may instantaneously be apart from the head of the driver 24.

In this way, the driver 24 has a feeling that his/her head falls, and thus the driver 24 can be instantaneously alerted. The rotation angle of the headrest 23 in step S15 is smaller than the rotation angle of the seatback 22 when the seat 20 transitions from the driving position to the relaxing position. This makes it possible to appropriately shorten the length over which the head of the driver 24 falls, appropriately adjust a stimulus given to the driver 24, and prevent the driver 24 from being injured.

Figure 6:
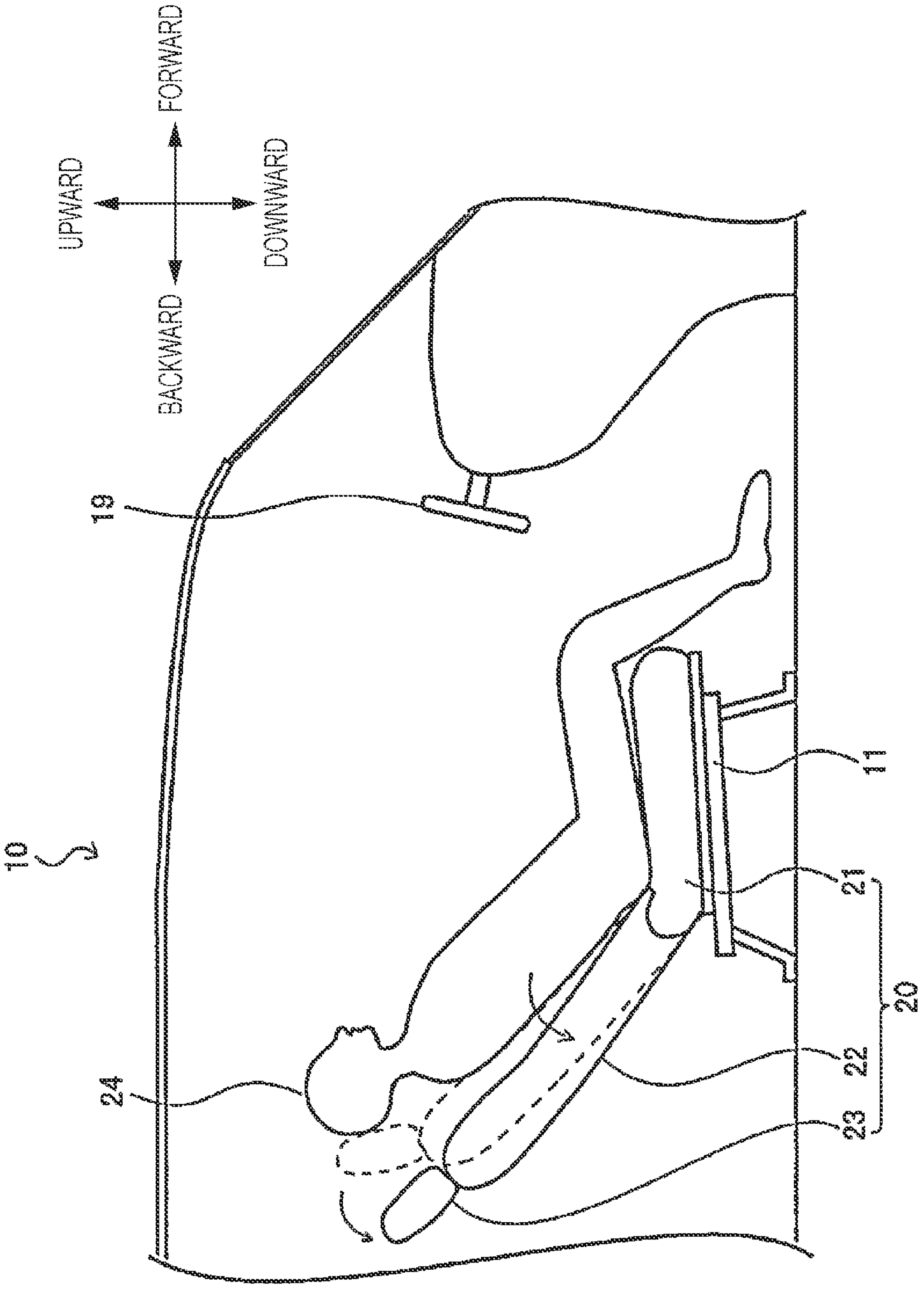
FIG. 6 is a side view illustrating a method for alerting a driver by tilting the seatback and the headrest in the vehicle seat control apparatus according to the embodiment of the disclosure.

Still another example of step S15 will be described with reference to FIG. 6. FIG. 6 is a side view illustrating a method for alerting the driver 24 by tilting the seatback 22 and the headrest 23 in the vehicle seat control apparatus 13. Here, the seatback 22 and the headrest 23 tilted in step S15 are depicted with a solid line, whereas the seatback 22 and the headrest 23 before being tilted are depicted with a broken line.

Here, the seat driving device 11 rotates the seatback 22 backward with the lower end thereof being a rotation center, and also rotates the headrest 23 backward with the lower end thereof being a rotation center, in response to an instruction from the computation control device 14. The seatback 22 and the headrest 23 may be rotated backward at the same timing, or any one of the seatback 22 and the headrest 23 may be rotated first and then the other may be rotated. The seatback 22 and the headrest 23 may be tilted backward while being in close contact with the upper limbs and head of the driver 24, respectively. Furthermore, the seatback 22 and the headrest 23 may instantaneously be apart from the upper limbs and head of the driver 24, respectively.

The rotation speeds of the seatback 22 and the headrest 23 in step S15 are higher than the rotation speed at which the seatback 22 is tilted when the seat 20 transitions from the driving position to the relaxing position. In this way, the driver 24 has a feeling that his/her limbs and head fall, and thus the driver 24 can be instantaneously alerted. The rotation angles of the seatback 22 and headrest 23 in step S15 are smaller than the rotation angle of the seatback 22 when the seat 20 transitions from the driving position to the relaxing position. This makes it possible to appropriately shorten the length over which the upper limbs and head of the driver 24 fall, appropriately adjust a stimulus given to the driver 24, and prevent the driver 24 from being injured.

In step S16, the seat 20 is restored to the driving position. That is, the entire seat 20 is moved forward and the seatback 22 is rotated forward so that the position and attitude of the seat 20 returns to the driving position illustrated in FIG. 2A. In a case where the headrest 23 is rotated backward in step S15, the headrest 23 is rotated forward. The driver 24 performs low automated driving of steering the vehicle 10 and adjusting the speed of the vehicle 10 in this state.

In step S17, as in step S14, the computation control device 14 makes a driving takeover request. For example, the computation control device 14 displays a message or the like that prompts the driver 24 to take over driving on a display, or outputs a sound that prompts the driver 24 to take over driving from a speaker. Accordingly, the driver 24 is able to be aware that the vehicle 10 will shift to low automated driving and that the driver 24 is requested to intervene in driving.

In step S18, driving takeover of the vehicle 10 from high automated driving to low automated driving is completed, and the driver 24 performs steering and braking of the vehicle 10.

The following main effects can be obtained from the above-described embodiment.

As a result of performing an alerting operation of displacing the seat 20 downward in a case where the alertness level of the driver 24 is lower than the certain level when driving of the vehicle 10 transitions from high automated driving to low automated driving, it is possible to alert the driver 24 and perform driving by the driver 24. Furthermore, in the disclosure, in an alerting operation, a part of the seat 20 is displaced downward at a higher speed than at a transition from the driving position to the relaxing position. This makes it is possible to give an appropriate stimulus to the driver 24 and alert the driver 24.

As illustrated in FIG. 4, as a result of displacing the seatback 22 downward at a high speed, it is possible to immediately alert the driver 24 and prompt the driver 24 to intervene in driving.

As illustrated in FIG. 5, as a result of displacing the headrest 23 downward at a high speed, it is possible to effectively alert the driver 24.

As illustrated in FIG. 6, as a result of displacing both the seatback 22 and the headrest 23 at a high speed, it is possible to more effectively alert the driver 24.

In addition, as a result of tilting the seat 20 or the seatback 22 backward, it is possible to easily perform an alerting operation.

While the embodiment of the disclosure has been described above, the disclosure is not limited thereto. Modifications can be made without deviating from the gist of the disclosure. The above-described configurations can be combined with each other.

For example, in the description given above, the seatback 22 or the headrest 23 is rotated backward with the lower support point thereof being a center to alert the driver 24. Alternatively, the headrest 23, the seatback 22, or the entire seat 20 may be slid downward to alert the driver 24.

Furthermore, the above-described alerting operation may be performed continuously or intermittently over a certain period if it is not determined that the driver 24 has become alert. If it is not determined, after the certain period has elapsed, that the driver 24 has become alert, emergency measures may be taken, for example, the vehicle 10 may be stopped.

If execution of the above-described alerting operation on the driver 24 is determined to be inappropriate for a physical or mental reason, for example, the driver 24 is pregnant, on the basis of a sensing result or the like that is registered or input in advance, the computation control device 14 may cancel the above-described alerting operation and may preferentially make a notification using a sound or the like. If the driver 24 does not become alert and if another safety system equipped in the vehicle 10 is to start operating or is making preparation for start, the computation control device 14 is capable of performing an alerting operation according to the present embodiment. A setting may be made so that the driver 24 can select whether to implement the present embodiment, or whether to implement the present embodiment may be set in accordance with a road condition, a lane on which the vehicle 10 travels, or the like.

Furthermore, referring to FIGS. 4 to 6, when performing an alerting operation of alerting the driver 24, the computation control device 14 is capable of displacing either or both of the seatback 22 and the headrest 23 in a direction other than a downward direction, for example, an upward direction, a left direction, or a right direction. As an example, referring to FIG. 5, when performing an alerting operation, the seat driving device 11 may tilt the headrest 23 forward in response to an instruction from the computation control device 14. Also with this control, it is possible to tilt the head of the driver 24 forward and effectively alert the driver 24.

Furthermore, referring to FIGS. 2A and 2B, at a transition from the relaxing position to the driving position, an alerting operation can be performed by increasing the transition speed of the seat 20 at least temporarily. In one example, the seat driving device 11 moves forward the seatback 22 of the seat 20 in the relaxing position at a high speed in response to an instruction from the computation control device 14. Next, if the alertness level of the driver 24 detected by the alertness detecting device 25 is higher than or equal to the certain level, the seat driving device 11 sets the seat 20 to the driving position illustrated in FIG. 2A at a normal speed in response to an instruction from the computation control device 14. Also with this control, it is possible to effectively alert the driver 24 at a transition from the relaxing position to the driving position.

In addition, referring to FIG. 4, an alerting operation may be an operation of displacing the seatback 22 downward after temporarily displacing the seatback 22 upward. That is, the seat driving device 11 raises the seatback 22 at a high speed in response to an instruction from the computation control device 14. Subsequently, if the alertness level of the driver 24 detected by the alertness detecting device 25 is lower than the certain level, the seat driving device 11 tilts the seatback 22 downward at a high speed in response to an instruction from the computation control device 14. Also with this control, it is possible to effectively alert the driver 24.

The technical spirit that can be grasped from the above-described embodiment will be described below together with the effects thereof.

In a vehicle seat control apparatus according to an aspect of the disclosure, a seat driving device causes a seat to be temporarily apart from the body of a driver in response to an instruction from a computation control device in an alerting operation. Accordingly, it is possible to cause the body of the driver to fall slightly downward, and to alert the driver.

In the vehicle seat control apparatus according to the aspect of the disclosure, low automated driving is manual driving, and high automated driving is full-automated driving. Accordingly, it is possible to alert the driver and cause the driver to immediately intervene in driving in response to a driving takeover request that is made in emergency or the like.

The computation control device 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the computation control device 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle seat control apparatus that is equipped in a vehicle capable of travelling by automated driving in accordance with a relative level of driving automation and that is configured to set a position and attitude of a seat of the vehicle to a driving position in low automated driving that is low in the level and to set the position and attitude of the seat to a relaxing position in high automated driving that is high in the level, the vehicle seat control apparatus comprising:

an alertness detecting device;

a computation control device; and a seat driving device, wherein the alertness detecting device is configured to detect an alertness level of a driver to be seated on the seat, the computation control device is configured to drive the seat driving device to perform an alerting operation in a case where the alertness level of the driver detected by the alertness detecting device is lower than a predetermined level when driving of the vehicle transitions from the high automated driving to the low automated driving, and the seat driving device is configured to, in response to an instruction from the computation control device in the alerting operation, displace the seat at a higher speed than at a transition from the driving position to the relaxing position.

2. The vehicle seat control apparatus according to claim 1, wherein the seat driving device is configured to displace a seatback of the seat when the alerting operation is being performed.

3. The vehicle seat control apparatus according to claim 1, wherein the seat driving device is configured to displace a headrest of the seat when the alerting operation is being performed.

4. The vehicle seat control apparatus according to claim 1, wherein the seat driving device is configured to displace a seatback of the seat and a headrest of the seat when the alerting operation is being performed.

5. The vehicle seat control apparatus according to claim 2, wherein an operation of displacing the seat or the seatback downward comprises an operation of tilting the seat or the seatback backward.

6. The vehicle seat control apparatus according to claim 3, wherein an operation of displacing the seat or the seatback downward comprises an operation of tilting the seat or the seatback backward.

7. The vehicle seat control apparatus according to claim 4, wherein an operation of displacing the seat or the seatback downward comprises an operation of tilting the seat or the seatback backward.

8. A vehicle seat control apparatus that is equipped in a vehicle capable of travelling by automated driving in accordance with a relative level of driving automation and that is configured to set a position and attitude of a seat of the vehicle to a driving position in low automated driving that is low in the level and to set the position and attitude of the seat to a relaxing position in high automated driving that is high in the level, the vehicle seat control apparatus comprising:

an alertness detector including a sensor;

circuitry; and a seat driver, wherein the alertness detector is configured to detect an alertness level of a driver to be seated on the seat, the circuitry is configured to drive the seat driver to perform an alerting operation in a case where the alertness level of the driver detected by the alertness detector is lower than a predetermined level when driving of the vehicle transitions from the high automated driving to the low automated driving, and the seat driver is configured to, in response to an instruction from the circuitry in the alerting operation, displace the seat at a higher speed than at a transition from the driving position to the relaxing position.

* * * * *